United States Patent
Eluru et al.

(10) Patent No.: US 10,836,946 B2
(45) Date of Patent: Nov. 17, 2020

(54) SUGAR-BASED SURFACTANT FOR WELL TREATMENT FLUIDS

(71) Applicant: Halliburton Energy Services, Inc., Houston, TX (US)

(72) Inventors: Sairam Eluru, Pune (IN); Chetan Prakash, Pune (IN); Shreya Mohan, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 50 days.

(21) Appl. No.: 16/061,627

(22) PCT Filed: Mar. 28, 2016

(86) PCT No.: PCT/US2016/024526
§ 371 (c)(1),
(2) Date: Jun. 12, 2018

(87) PCT Pub. No.: WO2017/171712
PCT Pub. Date: Oct. 5, 2017

(65) Prior Publication Data
US 2019/0345372 A1   Nov. 14, 2019

(51) Int. Cl.
*C09K 8/08* (2006.01)
*C09K 8/467* (2006.01)
*C09K 8/60* (2006.01)
*C09K 8/68* (2006.01)
*C09K 8/86* (2006.01)

(52) U.S. Cl.
CPC ............ *C09K 8/08* (2013.01); *C09K 8/467* (2013.01); *C09K 8/604* (2013.01); *C09K 8/68* (2013.01); *C09K 8/86* (2013.01)

(58) Field of Classification Search
None
See application file for complete search history.

(56) References Cited

U.S. PATENT DOCUMENTS

| | | | |
|---|---|---|---|
| 7,507,399 B1 | 3/2009 | O'Lenick, Jr. | |
| 8,299,009 B2 | 10/2012 | Hodge et al. | |
| 2006/0105919 A1 | 5/2006 | Colaco et al. | |
| 2011/0259583 A1* | 10/2011 | Bittner | C09K 8/584 166/270.1 |
| 2014/0251614 A1 | 9/2014 | Muthusamy et al. | |
| 2015/0126417 A1* | 5/2015 | Hatchman | C09K 8/58 507/219 |
| 2015/0353815 A1 | 12/2015 | Kurkal-Siebert et al. | |
| 2017/0101576 A1* | 4/2017 | Langlotz | C08L 33/26 |

FOREIGN PATENT DOCUMENTS

| | | |
|---|---|---|
| WO | 2011086361 A1 | 7/2011 |
| WO | 2014137455 A1 | 9/2014 |

* cited by examiner

*Primary Examiner* — John J Figueroa
(74) *Attorney, Agent, or Firm* — McAfee & Taft

(57) ABSTRACT

A well treatment fluid comprising an aqueous base fluid and a sugar-based surfactant is provided. The sugar-based surfactant includes at least one betaine functionalized alkyl polyglucoside. Also provided is a method of treating an oil and gas well.

20 Claims, 2 Drawing Sheets

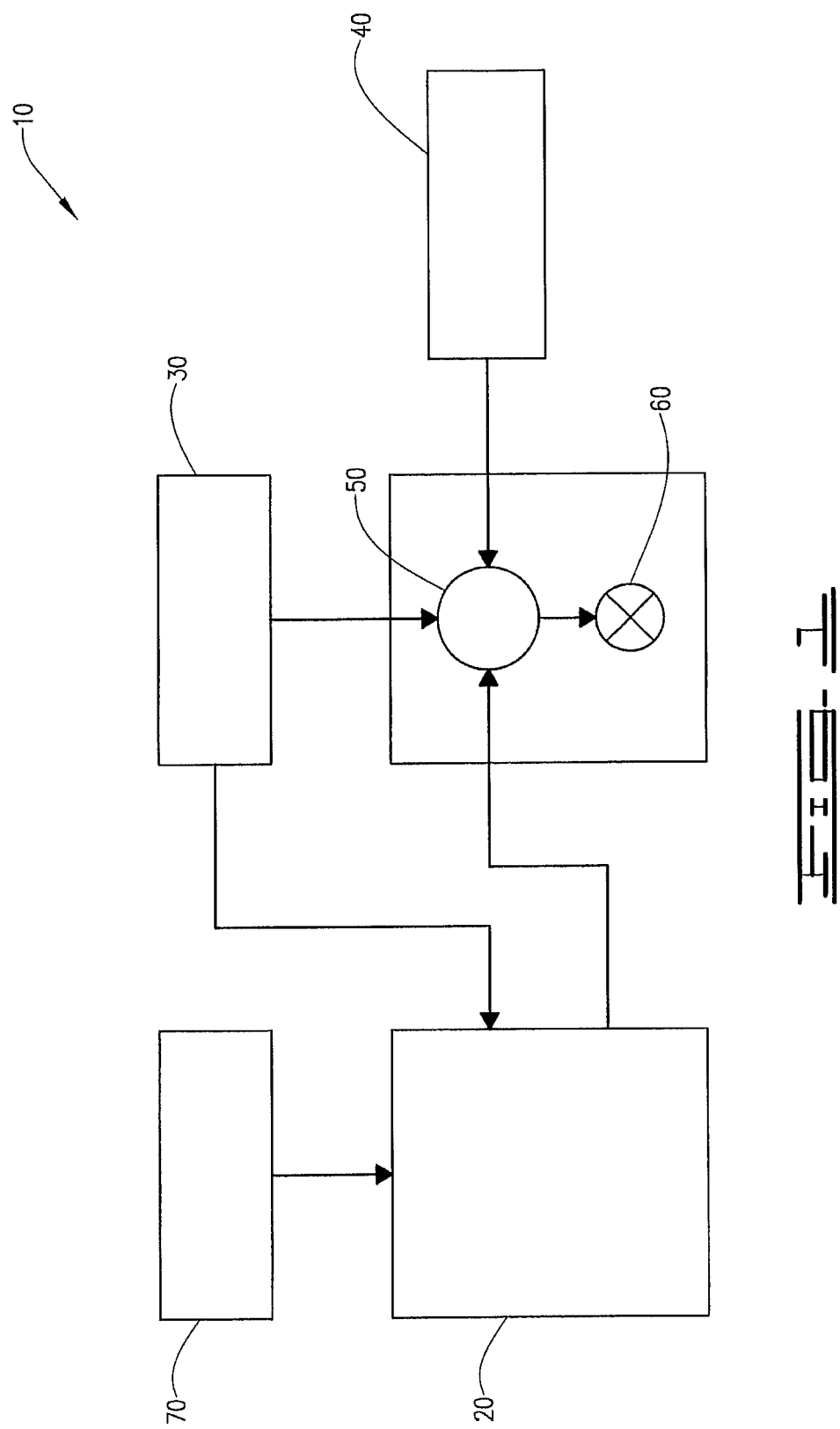

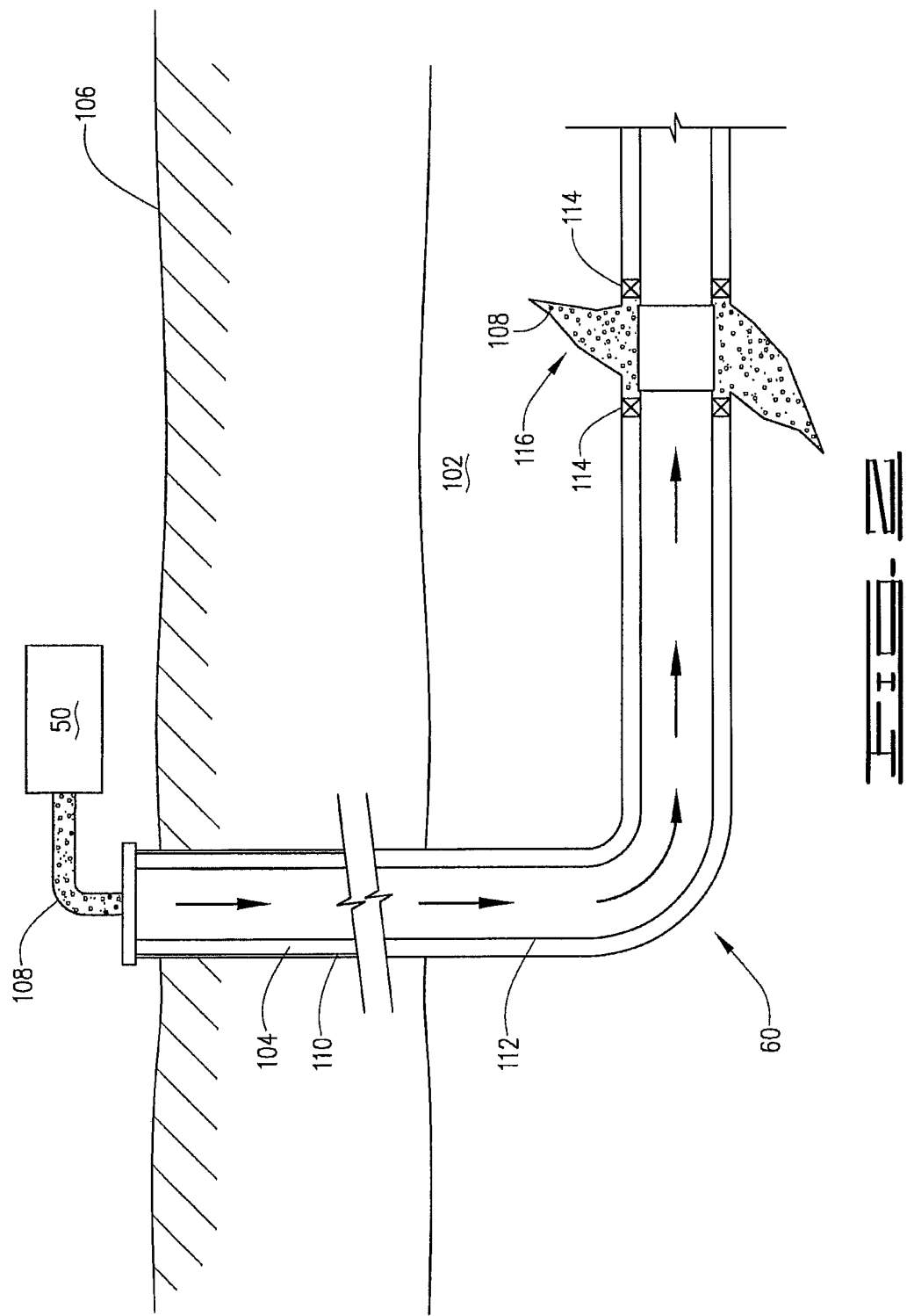

SUGAR-BASED SURFACTANT FOR WELL TREATMENT FLUIDS

CROSS RELATED

This application claims the benefit of previously filed International Application PCT/US16/24526 filed Mar. 28, 2016.

BACKGROUND

This disclosure relates to treatment compositions for use in connection with oil and gas wells, including treatment compositions that are used to drill the well (for example, aqueous based drilling muds), treatment compositions that are used to cement the casing and otherwise complete the well (for example, aqueous based cement compositions) and treatment compositions that are used to treat or stimulate a formation penetrated by the wellbore (for example, aqueous based fracturing fluids and aqueous based acidizing fluids). This disclosure also relates to methods of treating oil and gas wells.

One problem that can occur in connection with the use of drilling fluids, cementing fluids, stimulation fluids and other well treatment fluids is the formation of emulsions between water in the treatment fluid and oil in the formation. For example, aqueous based drilling muds, aqueous based cement compositions, and high density brines and gels used in connection with gravel packing operations can leak off into the formation, come into contact with hydrocarbons in the formation water and form oil emulsions therein. Aqueous based fracturing fluids, acidizing fluids and other formation treatment fluids that contact hydrocarbons in the formation can also form water and oil emulsions in the formation. Such emulsions can be stabilized by native surfactants, fluid loss control additives and other components present in the well treatment fluid, as well as asphaltenes and other components present in the formation. As a result, for example, the emulsions can remain strongly associated with the formation and impede hydrocarbon flow in the formation. If the emulsions are not broken, they can have a detrimental impact on hydrocarbon production from the formation.

For example, hydraulic fracturing involves fracturing a portion of a formation by injecting a fracturing fluid into the wellbore and directing the fracturing fluid into the formation at a pressure sufficient to initiate or extend a fracture in the formation. Proppant particulates are placed in the fracture to hold the fracture open once the hydraulic pressure on the formation is released. Most aqueous based fracturing fluids are fairly complex and include multiple components in addition to the aqueous carrier fluid and proppant particulates. Examples of additional components commonly used in fracturing fluids include polymers, gels, cross-linking agents, fluid loss control agents and gel breakers. Numerous other components are often used as well. Unfortunately, emulsions formed by contact of water in the aqueous carrier fluid with oil in the formation are often stabilized by one or more of these additional components.

In order to address problematic water and oil emulsions, various commercially available non-emulsifying agents and de-emulsifying agents can be added to the well treatment fluid to prevent the emulsions from forming and breaking emulsions that do form. However, many of these surfactants have very low flash points (for example, around 70° F.) and may not be thermally stable at higher temperatures.

BRIEF DESCRIPTION OF THE DRAWINGS

The drawings included with this application illustrate certain aspects of the embodiments described herein. However, the drawings should not be viewed as exclusive embodiments. The subject matter disclosed is capable of considerable modifications, alterations, combinations, and equivalents in form and function, as will occur to those skilled in the art with the benefit of this disclosure.

FIG. 1 is a diagram illustrating an example of a fracturing system that can be used in accordance with certain embodiments of the present disclosure.

FIG. 2 is a diagram illustrating an example of a subterranean formation in which a fracturing operation can be performed in accordance with certain embodiments of the present disclosure.

DETAILED DESCRIPTION

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In accordance with the present disclosure, a well treatment fluid and a method of treating an oil and gas well are provided. As used herein and in the appended claims, an oil and gas well means a wellbore extending into the ground and penetrating a subterranean formation. A well treatment fluid means any fluid that is introduced into an oil and gas well to treat the well or the formation. Examples of well treatment fluids include aqueous injection fluids, drilling muds and other drilling fluids, aqueous pre-flush fluids, aqueous cement compositions, aqueous completion fluids, aqueous work-over fluids, aqueous fracturing fluids, aqueous acidizing fluids and other aqueous stimulation fluids.

The well treatment fluid disclosed herein comprises an aqueous base fluid and a sugar-based surfactant. The sugar-based surfactant is an effective non-emulsifying agent for use in well treatment fluids. As used herein and in the appended claims, a non-emulsifying agent means a surfactant that functions to prevent the formation of water and oil emulsions between water in the treatment fluid and hydrocarbons (for example, crude oil) in the formation and/or break any such emulsions that do form. The sugar based surfactant can also function as a rheology modifier to improve the rheological properties of well treatment fluids. It can also function as a foaming agent in connection with fracturing fluids and other types of well treatment fluids. It can act as a chelating agent and is effective over a wide pH range.

For example, the aqueous base fluid of the well treatment fluid disclosed herein can be water. The water can be fresh water, sea water, brine, produced water, and mixtures thereof.

The sugar-based surfactant of the well treatment fluid disclosed herein includes at least one betaine functionalized alkyl polyglucoside. For example, the sugar-based surfactant can be diluted with water, or with a solvent such as methanol or petroleum benzene. On the other hand, the sugar-based surfactant can consist only of one or more betaine functionalized alkyl polyglucosides.

12 carbon atoms and betaine functionalized alkyl polyglucosides having 14 carbon atoms. For example, the betaine functionalized alkyl polyglucoside(s) of the sugar-based surfactant disclosed herein can be sodium hydroxypropylsulfonate decyl glucoside. For example, the betaine functionalized alkyl polyglucoside(s) of the sugar-based surfactant disclosed herein can be a sodium bis-hydroxyethylglycinate lauryl-glucosides copolymer.

For example, the betaine functionalized alkyl polyglucoside(s) of the sugar-based surfactant disclosed herein can have the following representative formula:

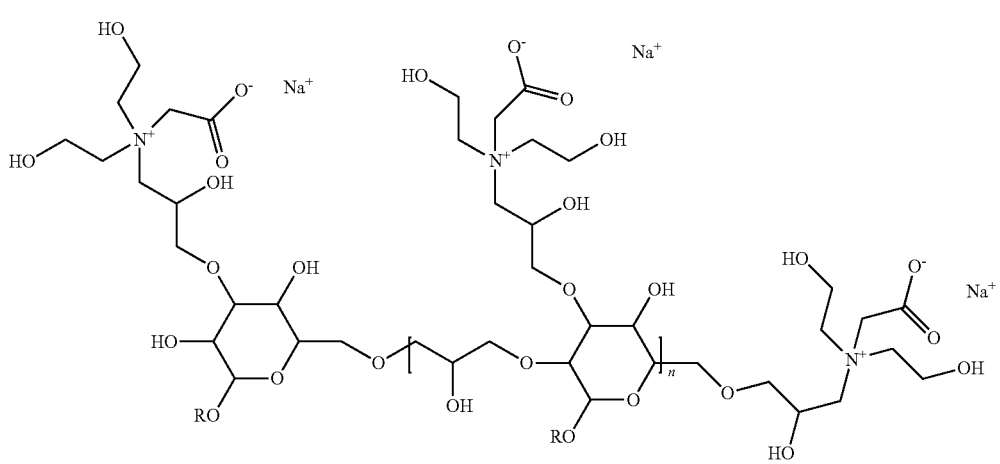

(1)

wherein the alkyl moiety (R) of the above formula (1) contains 12 or 14 carbon atoms, and n is a finite number. For example, n of the above formula can be in the range of from 2 to 6. For example, n of the above formula can be in the range of from 2 to 4.

The betaine functionalized alkyl polyglucoside(s) of the sugar-based surfactant disclosed herein has a relatively high flash point and good thermal stability. Also, the betaine functionalized alkyl polyglucoside(s) of the sugar-based surfactant is biodegradable.

The betaine functionalized alkyl polyglucoside(s) has a sugar backbone and is naturally derived from an alkyl polyglucoside. For example, the betaine functionalized alkyl polyglucoside(s) can be manufactured using a renewable carbon source. For example, the renewable carbon source can be selected from the group consisting of corn, coconut and mixtures thereof.

As used herein and in the appended claims, the term "alkyl" refers to a straight or branched chain monovalent hydrocarbon radical having a specified number of carbon atoms. Alkyl groups may be unsubstituted or substituted with substituents that do not interfere with the specified function of the well treatment composition and may be substituted once or twice with the same or different group. Substituents may include alkoxy, hydroxy, mercapto, amino, alkyl substituted amino, nitro, carboxy, carbonyl, carbonyloxy, cyano, methylsulfonylamino, or halogen, for example. Examples of "alkyl" include, but are not limited to, methyl, ethyl, n-propyl, isopropyl, n-butyl, s-butyl, t-butyl, n-pentyl, n-hexyl, 3-methylpentyl, and the like.

For example, the betaine functionalized alkyl polyglucoside(s) of the sugar-based surfactant disclosed herein can be selected from the group consisting of betaine functionalized alkyl polyglucosides having 12 carbon atoms, betaine functionalized alkyl polyglucosides having 14 carbon atoms, and mixtures thereof. For example, the betaine functionalized alkyl polyglucoside(s) of the sugar-based surfactant disclosed herein can be a blend of betaine functionalized alkyl polyglucosides having 12 carbon atoms and betaine functionalized alkyl polyglucosides having 14 carbon atoms. For example, the betaine functionalized alkyl polyglucoside(s) of the sugar-based surfactant disclosed herein can be a 50/50 blend of betaine functionalized alkyl polyglucosides having An example of a commercially available betaine functionalized alkyl polyglucoside that can be used as the sugar-based surfactant disclosed herein is Poly Suga® Betaine L (a 50/50 blend of $C_{12}$ and $C_{14}$ betaine functionalized alkyl polyglucosides available from Colonial Chemical, Inc., located in South Pittsburgh, Tenn.). According to literature published by the manufacturer, this sugar-based surfactant has a flash point that is over 200° F. and causes less eye irritation than cocoamidopropyl betaine. For example, Poly Suga® Betaine L is sold as a 40% active solution of a 50/50 blend of $C_{12}$ and $C_{14}$ betaine functionalized alkyl polyglucosides.

The exact amount of the sugar-based surfactant present in the well treatment fluid disclosed herein will vary depending on the amount of betaine functionalized alkyl polyglucoside (active surfactant) present in the sugar-based surfactant, as well as the additional components present in the well treatment fluid and the particular application. The amount of betaine functionalized alkyl polyglucoside(s) (active surfactant) present in the sugar-based surfactant will depend, for example, on the amount of water or other solvent, if any, used in the sugar-based surfactant.

Generally, for example, the sugar-based surfactant is present in the well treatment fluid in an amount sufficient to impart in the range of from about 0.00001% to about 30% by volume of betaine functionalized alkyl polyglucoside (active surfactant) to the well treatment fluid, based on the total volume of the well treatment fluid. For example, the sugar-based surfactant is present in the well treatment fluid in an amount sufficient to impart in the range of from about 0.001% to about 10% by volume of betaine functionalized alkyl polyglucoside (active surfactant) to the well treatment fluid, based on the total volume of the well treatment fluid. For example, the sugar-based surfactant is present in the well treatment fluid in an amount sufficient to impart in the range of from about 0.01% to about 3% by volume of betaine functionalized alkyl polyglucoside (active surfactant) to the well treatment fluid, based on the total volume of the well treatment fluid. For example, the sugar-based surfactant is present in the well treatment fluid in an amount sufficient to impart about 0.08% by volume of betaine functionalized alkyl polyglucoside (active surfactant) to the well treatment fluid, based on the total volume of the well treatment fluid.

For example, the sugar-based surfactant can be added to the aqueous base fluid and other components of the well treatment fluid at the site of the well. For example, the sugar-based surfactant can be added to the aqueous base fluid on the fly as the well treatment fluid is pumped into the wellbore.

The additional components included in the well treatment fluid disclosed herein will vary depending on the intended use of the well treatment fluid. For example, additional types of sugar-based surfactants and non-sugar-based surfactants can be included in the well treatment fluid as well depending on the application.

For example, in one embodiment, the well treatment fluid is an aqueous-based drilling fluid for use in drilling wells into a subterranean formation. In addition to water and the sugar-based surfactant, the drilling fluid can contain, for example, one or more weighting materials, fluid loss control additives, bridging materials, lubricants, corrosion inhibition agents, and/or suspending agents. For example, the contact of water from the aqueous base fluid of the drilling fluid with oil in the formation will be less likely to result in the formation of problematic water and oil emulsions in the formation.

For example, in another embodiment, the well treatment fluid is an aqueous based fracturing fluid that can be pumped through the wellbore and into the formation at a sufficient pressure to fracture or extend an existing fracture in the formation. In addition to water and the sugar-based surfactant, the fracturing fluid can include a plurality of proppant particulates for propping the fractures open. For example, the proppant particulates can have an average particle size in the range of from 0.1 microns to 10 millimeters. For example, the proppant particulates can be sand.

In addition, for example, the aqueous based fracturing fluid can include clay control agents, gels, gelling agents, gel stabilizers, cross-linkers, breakers, buffers, biocides, bactericides, scale inhibitors, viscosifying agents, additional non-emulsifiers and additional components, depending on the application.

Examples of clay control agents that can be used include salts such as potassium chloride, sodium chloride, ammonium chloride, choline chloride, di-quaternary polymers and poly quaternary polymers.

Examples of gelling agents that can be used include polyacrylamide and other acrylamide based gelling agents, guar and guar derivatives, including hydroxy propyl guar, carboxy methyl guar and carboxy methyl hydroxyl propyl guar, cellulose and cellulose derivatives, xanthan, diutane, hydroxy propyl cellulose phosphate, hydroxy propyl starch phosphate, polymer based gelling agents and combinations thereof.

Examples of gel stabilizers that can be used include sodium thiosulfate, isoascorbate, erythroborate, and combinations thereof. For example, the gel stabilizer may be included in the fracturing fluid in an amount in the range of from about 0.001% to about 1% by weight, based on the weight of the aqueous base fluid.

Examples of cross-linkers that can be used include boric acid, disodium octaborate tetrahydrate, sodium diborate, pentaborates, ulexite and colemanite, compounds that can supply zirconium IV ions (such as, for example, zirconium lactate, zirconium acetate lactate, zirconium lactate triethanolamine, zirconium carbonate, zirconium acetylacetonate, zirconium malate, zirconium citrate, and zirconium diisopropylamine lactate), compounds that can supply titanium IV ions (such as, for example, titanium lactate, titanium malate, titanium citrate, titanium ammonium lactate, titanium triethanolamine, and titanium acetylacetonate), aluminum compounds including, for example, aluminum lactate and aluminum citrate, antimony compounds, chromium compounds, iron compounds, copper compounds, zinc compounds, and combinations thereof.

Examples of breakers that can be used include enzyme breakers, oxidizers, acid breakers and delay-release breakers.

Examples of buffers that can be used include sodium hydroxide, potassium hydroxide, sodium carbonate, sodium bicarbonate, potassium carbonate, potassium bicarbonate, acetic acid, sodium acetate, sulfamic acid, hydrochloric acid, formic acid, citric acid, phosphonic acid, polymeric acids and combinations thereof.

Examples of biocides and bactericides that can be used include 2,2-dibromo-3-nitrilopropionamide, 2-bromo-2-nitro-1,3-propanediol, sodium hypochlorite, and combinations thereof. For example, biocides and bactericides may be included in the fracturing fluid in an amount in the range of from about 0.001% to about 0.1% by weight, based on the weight of the aqueous base fluid.

Examples of scale inhibitors that can be used include bis(hexamethylene triamine penta(methylene phosphonic acid)), diethylene triamine penta(methylene phosphonic acid), ethylene diamine tetra(methylene phosphonic acid), hexamethylenediamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonate, phosphonic acid, aminoalkylene phosphonic acid, aminoalkyl phosphonic acid, polyphosphate, salts of polyphosphate, and combinations thereof. For example, the scale inhibitors can be included in the fracturing fluid in an amount in the range of from about 0.001% to about 0.1% by weight, based on the weight of the aqueous base fluid Examples of additional non-emulsifiers that can be used include cationic, non-ionic, anionic, and zwitterionic non-emulsifiers. Specific examples of additional non-emulsifiers that can be used include a combination of terpene and an ethoxylated alcohol, ethoxylated nonyl phenols, octyl phenol polyethoxyethanol, potassium myristate, potassium stearylsulfate, sodium lauryl sulfonate, polyoxyethylene alkyl phenol, polyoxyethylene, polyoxyethylene (20 mole) stearyl ether, N-cetyl N-ethyl morpholinium ethosulfate, and combinations thereof. For example, an additional non-emulsifier can be included in the fracturing fluid in an amount in the range of from about 0.001% to about 5% by weigh, based on the weight of the base aqueous fluid.

The method of treating an oil and gas well disclosed herein comprises introducing the well treatment fluid disclosed herein into the well. For example, the formation can be treated in accordance with the method by introducing the well treatment fluid into the wellbore and into the formation through the wellbore. For example, the well treatment fluid can be a fracturing fluid.

Thus, for example, in one aspect, this disclosure provides a well treatment fluid that comprises an aqueous base fluid and a sugar-based non-emulsifying agent, the sugar-based non-emulsifying agent consisting of one or more betaine functionalized alkyl polyglucosides. In another aspect, this disclosure provides a fracturing fluid that comprises an aqueous based fluid, one or more proppant particulates, and a sugar-based non-emulsifying agent, the sugar-based non-emulsifying agent consisting of one or more betaine functionalized alkyl polyglucosides. In yet another aspect, this disclosure provides a method of treating an oil and gas well, comprising introducing a well treatment fluid into the well. The well treatment fluid comprises an aqueous base fluid, and a sugar-based non-emulsifying agent, the sugar-based surfactant consisting of one or more betaine functionalized alkyl polyglucosides.

The exemplary compositions and methods disclosed herein may directly or indirectly affect one or more components or pieces of equipment associated with the preparation, delivery, recapture, recycling, reuse, and/or disposal of the disclosed compositions. For example, and with reference to FIG. 1, the disclosed compositions and methods may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50, and resides at the surface at a well site where a well 60 is located.

In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, other optional additives can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on-the-fly" methods. Thus, for example, the pump and blender system 50 can provide just fracturing fluid into the well at some times, just proppants at other times, and combinations of those components at yet other times.

FIG. 2 shows the well 60 during a fracturing operation in a portion of a subterranean formation of interest 102 surrounding a wellbore 104. The wellbore 104 extends from the surface 106, and the fracturing fluid 108 is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can also be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the wellbore 104. The pump and blender system 50 is coupled to the work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 2 shows two packers 114, one defining an uphole boundary of the interval and one defining the downhole end of the interval. When the fracturing fluid 108 is introduced into wellbore 104 (e.g., in FIG. 2, the area of the wellbore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the wellbore. These proppant particulates may "prop" fractures 116 such that fluids may flow more freely through the fractures 116.

While not specifically illustrated herein, the disclosed compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

Non-Emulsification Test

The sugar-based surfactant of the well treatment fluid disclosed herein was tested in the laboratory to confirm that it will inhibit the formation of water and oil emulsions upon contact of water in the well treatment fluid with crude oil. The specific sugar-based surfactant used in the test was a 40% active solution of a 50/50 blend of $C_{12}$ and $C_{14}$ betaine functionalized alkyl polyglucosides sold in association with the trademark Poly Suga® Betaine L by Colonial Chemical, Inc., located in South Pittsburgh, Tenn.

First, approximately 1000 mL of a fracturing fluid were added to a beaker and allowed to break. Thereafter, approximately 2 mL of the sugar-based surfactant were mixed with the broken fracturing fluid. The fracturing fluid utilized was an aqueous based delayed borate cross-linked fluid sold by Halliburton Energy Services, Inc. in association with the trademark HYBOR™ Fluid. The aqueous base fluid of the fracturing fluid was fresh water.

Next, approximately 50 mL of the fracturing fluid/sugar-based surfactant mixture and 50 mL of crude oil were added to a jar and shaken vigorously. It was determined by visual observation that an oil-in-water emulsion was formed in the jar. The jar was then placed in a water bath and heated to 150° F. After approximately 15 minutes, a complete phase separation of the emulsion had taken place. Specifically, it was determined by visual observation that the crude oil and fracturing fluid had separated.

Example 2

Rheology Test—240° F.

Tests were carried out to understand the effect of the sugar-based surfactant of the well treatment fluid disclosed herein on the rheology of a fracturing fluid. The specific sugar-based surfactant used in the test was a 40% active solution of a 50/50 blend of $C_{12}$ and $C_{14}$ betaine functionalized alkyl polyglucosides sold in association with the trademark Poly Suga® Betaine L by Colonial Chemical, Inc., located in South Pittsburgh, Tenn.

First, a fracturing fluid was prepared by mixing the components set forth in Table 1 below together in the order and concentration set forth in the table.

TABLE 1

| Mixing Order | Additive | Chemical Nature | Test 1 (240° F.) | Test 2 (240° F.) | Test 3 (270° F.) | Test 4 (270° F.) |
|---|---|---|---|---|---|---|
| 1 | Tap water | | Base fluid | Base fluid | Base fluid | Base fluid |
| 2 | Aldacide ® G | Glutaraldehyde | 0.1 gal/Mgal | 0.1 gal/Mgal | 0.1 gal/Mgal | 0.1 gal/Mgal |
| 3 | KCl | | 3% w/v | 3% w/v | 3% w/v | 3% w/v |
| 4 | WG-11TM | Hydroxypropyl guar | 40 lb/Mgal | 40 lb/Mgal | 40 lb/Mgal | 40 lb/Mgal |
| 5 | BA-20 TM | Ammonium acetate and acetic acid | 0.2 gal/Mgal | 0.2 gal/Mgal | 0.2 gal/Mgal | 0.2 gal/Mgal |
| 6 | Poly Suga ® Betaine L | a 40% active solution of a 50/50 blend of $C_{12}$ and $C_{14}$ betaine functionalized alkyl polyglucosides | 0 gal/Mgal | 2 gal/Mgal | 0 gal/Mgal | 2 gal/Mgal |
| 7 | BA-40LTM | Potassium carbonate | 2.5 gal/Mgal | 2.5 gal/Mgal | 2.5 gal/Mgal | 2.5 gal/Mgal |
| 8 | MO-67TM | Sodium hydroxide | 2.5 gal/Mgal | 2.5 gal/Mgal | 3.5 gal/Mgal | 3.5 gal/Mgal |
| 9 | Gel Sta LTM | Sodium thiosulfate | 3 gal/Mgal | 3 gal/Mgal | 6 gal/Mgal | 6 gal/Mgal |
| 10 | ViCon NFTM | Sodium chlorite | 1.5 gal/Mgal | 1.5 gal/Mgal | 0.15 gal/Mgal | 0.15 gal/Mgal |
| 11 | CL-28MTM | Borate crosslinker | 3 gal/Mgal | 3 gal/Mgal | 4.5 gal/Mgal | 4.5 gal/Mgal |

Next, a 52 mL sample of the fracturing fluid was added to the sample cup of a Chandler 5550 HPHT Viscometer. The sample cup was placed on the rotor and 300 psi of nitrogen was applied to the sample. The fluid was then sheared at a constant shear rate of 40 1/s using the R1-B5 rotor-bob combination of the viscometer.

The results of the tests are shown by Table 2 below:

TABLE 2

Rheology of Aqueous Based Fracturing Fluid - 240° F.

| | | Apparent viscosity in cP at 40 1/s | |
|---|---|---|---|
| Time in Minutes | Temperature ° F. | Without sugar based surfactant | With sugar based surfactant |
| 5 | 99 | 1108.543 | 227.677 |
| 10 | 170 | 1661.942 | 2118.224 |
| 15 | 230 | 1748.151 | 1558.845 |
| 20 | 240 | 1608.799 | 1735.696 |
| 25 | 240 | 1503.845 | 1812.891 |
| 30 | 240 | 1415.924 | 1765.796 |
| 35 | 240 | 1399.689 | 1774.1 |
| 40 | 240 | 1229.521 | 1714.936 |
| 45 | 240 | 1246.881 | 1661.942 |
| 50 | 240 | 1283.77 | 1637.496 |
| 55 | 240 | 1316.319 | 1603.485 |
| 60 | 240 | 1156.354 | 1538.102 |
| 65 | 240 | 1200.008 | 1549.153 |
| 70 | 240 | 1213.52 | 1486.163 |
| 75 | 240 | 1189.614 | 1492.794 |
| 80 | 240 | 1159.472 | 1427.831 |
| 85 | 240 | 1233.861 | 1392.113 |
| 90 | 240 | 1148.039 | 1381.289 |
| 95 | 240 | 1105.402 | 1385.618 |
| 100 | 240 | 1049.715 | 1314.149 |
| 105 | 240 | 1028.701 | 1264.24 |
| 110 | 240 | 1020.296 | 1333.665 |
| 115 | 240 | 987.1133 | 1327.169 |

As shown by Table 1, the addition of the sugar-based surfactant of the well treatment fluid disclosed herein to the fracturing fluid improved the rheology of the fracturing fluid, particularly by around 200 cp viscosity at 240° F. and at a 40 shear rate.

The above test was repeated using the same components and procedure except the test was carried out at a temperature of 270° F. The results of the tests are shown by Table 3 below:

TABLE 3

Rheology of Aqueous Based Fracturing Fluid - 270° F.

| | | Apparent viscosity in cP at 40 1/s | |
|---|---|---|---|
| Time in minutes | Temperature ° F. | Without sugar based surfactant | With sugar based surfactant |
| 5 | 107 | 1232.178 | 1237.067 |
| 10 | 175 | 2798.516 | 2900.35 |
| 15 | 245 | 2916.428 | 2844.966 |
| 20 | 265 | 2355.45 | 2534.106 |
| 25 | 270 | 2334.012 | 2387.608 |
| 30 | 270 | 2182.155 | 2203.593 |
| 35 | 270 | 2080.321 | 2153.57 |
| 40 | 270 | 1982.06 | 2189.301 |

TABLE 3-continued

Rheology of Aqueous Based Fracturing Fluid - 270° F.

| | | Apparent viscosity in cP at 40 1/s | |
|---|---|---|---|
| Time in minutes | Temperature ° F. | Without sugar based surfactant | With sugar based surfactant |
| 45 | 270 | 1756.955 | 2325.079 |
| 50 | 270 | 1596.165 | 2117.839 |
| 55 | 270 | 1463.959 | 2083.894 |
| 60 | 270 | 1319.249 | 1917.744 |
| 65 | 270 | 1215.628 | 1890.946 |
| 70 | 270 | 1228.134 | 1828.417 |
| 75 | 270 | 1199.549 | 1835.563 |
| 80 | 270 | 1199.549 | 1874.867 |
| 85 | 270 | 1195.976 | 1764.101 |
| 90 | 270 | 1201.336 | 1855.215 |

As shown by Table 3, the addition of the sugar-based surfactant of the well treatment fluid disclosed herein to the fracturing fluid even more significantly improved the rheology of the fracturing fluid at 270° F.

Therefore, the present compositions and methods are well adapted to attain the ends and advantages mentioned, as well as those that are inherent therein. The particular example disclosed above is illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating an oil and gas well, comprising:
    introducing a well treatment fluid into the well, said well treatment fluid including:
    an aqueous base fluid; and
    a sugar-based surfactant, said sugar-based surfactant including a betaine functionalized alkyl polyglucoside having the following formula:

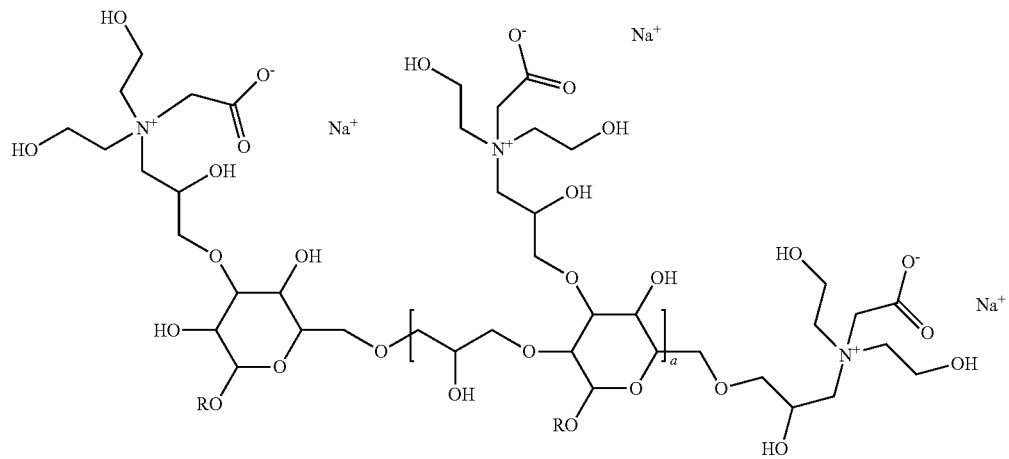

wherein R contains 12 or 14 carbon atoms, and n is a finite number.

2. The method of claim 1, wherein said betaine functionalized alkyl polyglucoside(s) is manufactured using a renewable carbon source.

3. The method of claim 2, wherein said renewable carbon source is selected from the group consisting of corn, coconut and mixtures thereof.

4. The method of claim 1, wherein said sugar-based surfactant is present in said well treatment fluid in an amount in the range of from about 0.00001% to about 30% by volume, based on the total volume of said treatment fluid.

5. The method of claim 4, wherein said sugar-based surfactant is present in said well treatment fluid in an amount in the range of from about 0.001% to about 10% by volume, based on the total volume of said treatment fluid.

6. The method of claim 1, wherein the well treatment fluid is an injection fluid, a drilling fluid, a pre-flush fluid, a cement composition, a completion fluid, a work-over fluid, or a stimulation fluid.

7. The method of claim 1, further comprising mixing the well treatment fluid using mixing equipment.

8. The method of claim 1, wherein the well treatment fluid is introduced into a subterranean formation using one or more pumps.

9. The method of claim 1, wherein the well treatment fluid is an injection fluid, a drilling fluid, a pre-flush fluid, a cement composition, a completion fluid, a work-over fluid, or a stimulation fluid, and wherein said sugar-based surfactant is present in said well treatment fluid in an amount in the range of from about 0.001% to about 10% by volume, based on the total volume of said treatment fluid.

10. The method of claim 9, wherein said betaine functionalized alkyl polyglucoside(s) is manufactured using a renewable carbon source.

11. The method of claim 10, wherein said renewable carbon source is selected from the group consisting of corn, coconut and mixtures thereof.

12. A method of treating an oil and gas well, comprising:
introducing a well treatment fluid into the well, said well treatment fluid being an aqueous based fracturing fluid and including:
an aqueous base fluid;
one or more proppant particulates; and
a sugar-based surfactant, said sugar-based surfactant including at least one betaine functionalized alkyl polyglucoside having the following formula:

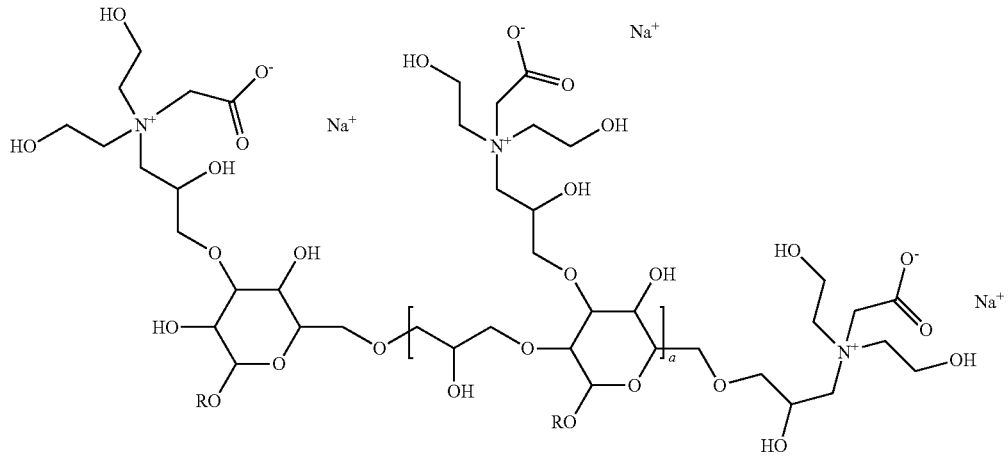

wherein R contains 12 or 14 carbon atoms, and n is a finite number.

13. The method of claim 12, wherein said betaine functionalized alkyl polyglucoside is manufactured using a renewable carbon source.

14. The method of claim 13, wherein said renewable carbon source is selected from the group consisting of corn, coconut and mixtures thereof.

15. The method of claim 12, wherein said sugar-based surfactant is present in said well treatment fluid in an amount in the range of from about 0.00001% to about 30% by volume, based on the total volume of said treatment fluid.

16. The method of claim 12, wherein the well treatment fluid is introduced into a subterranean formation using one or more pumps.

17. The method of claim 12, further comprising mixing the well treatment fluid using mixing equipment.

18. The method of claim 12, wherein said sugar-based surfactant is present in said well treatment fluid in an amount in the range of from about 0.001% to about 10% by volume, based on the total volume of said treatment fluid.

19. The method of claim 18, wherein said betaine functionalized alkyl polyglucoside is manufactured using a renewable carbon source.

20. The method of claim 19, wherein said renewable carbon source is selected from the group consisting of corn, coconut and mixtures thereof.

\* \* \* \* \*